United States Patent
Illsley et al.

(10) Patent No.: US 9,663,677 B2
(45) Date of Patent: *May 30, 2017

(54) CARBON DIOXIDE BARRIER COATING

(75) Inventors: Derek Ronald Illsley, Kent (GB);
Safaraz Akhtar Khan, Kent (GB);
Graham Trevor Street, London (GB)

(73) Assignee: Sun Chemical B.V., Weesp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/820,974

(22) PCT Filed: Sep. 7, 2011

(86) PCT No.: PCT/GB2011/051670
§ 371 (c)(1),
(2), (4) Date: Mar. 5, 2013

(87) PCT Pub. No.: WO2012/032343
PCT Pub. Date: Mar. 15, 2012

(65) Prior Publication Data
US 2013/0167480 A1 Jul. 4, 2013

Related U.S. Application Data

(60) Provisional application No. 61/380,357, filed on Sep. 7, 2010, provisional application No. 61/423,370, filed on Dec. 15, 2010.

(51) Int. Cl.
C09D 129/06 (2006.01)
B65D 81/20 (2006.01)
B65B 25/00 (2006.01)
B65B 31/02 (2006.01)
B65D 85/72 (2006.01)
C08J 7/04 (2006.01)
(Continued)

(52) U.S. Cl.
CPC ............ C09D 129/06 (2013.01); B65B 5/10 (2013.01); B65B 25/001 (2013.01); B65B 31/02 (2013.01);
(Continued)

(58) Field of Classification Search
CPC .. C09D 129/06; C09D 167/00; C09D 129/04; C09D 7/1216; B65B 5/10; B65B 25/001;
(Continued)

(56) References Cited

U.S. PATENT DOCUMENTS 4,966,780 A * 10/1990 Hargraves et al. ........... 426/118
5,876,812 A * 3/1999 Frisk et al. .................. 428/35.7
(Continued)

FOREIGN PATENT DOCUMENTS

EP 0590263 B1 * 4/1994
EP 0761739 A1 3/1997
(Continued)

OTHER PUBLICATIONS

Appalachian State University, Department of Physics and Astronomy "Labs- Error Analysis" (2016) https://physics.appstate.edu/undergraduate-programs/laboratory/resources/error-analysis.

*Primary Examiner* — Drew Becker
(74) *Attorney, Agent, or Firm* — Frost Brown Todd LLC

(57) ABSTRACT

A carbon dioxide gas barrier coating comprising clay dispersed in a polymer composition comprising EVOH, gas barrier materials such as laminate materials (20) including the coating (1) on a substrate (2), methods of enhancing the carbon dioxide barrier properties of materials using the coating, uses of the coating composition in enhancing the gas barrier properties of a substrate packages including the carbon dioxide barrier materials (20) and methods of protecting articles.

12 Claims, 2 Drawing Sheets

(51) Int. Cl.
*C08J 9/00* (2006.01)
*C09D 7/12* (2006.01)
*B65B 5/10* (2006.01)
*C09D 129/04* (2006.01)
*C09D 167/00* (2006.01)
*C08K 3/34* (2006.01)

(52) U.S. Cl.
CPC ............. *B65D 81/20* (2013.01); *B65D 85/72* (2013.01); *C08J 7/047* (2013.01); *C08J 9/0061* (2013.01); *C09D 7/1216* (2013.01); *C09D 129/04* (2013.01); *C09D 167/00* (2013.01); *C08J 2323/08* (2013.01); *C08J 2329/04* (2013.01); *C08K 3/346* (2013.01)

(58) Field of Classification Search
CPC ......... B65B 31/02; C08J 7/047; C08J 9/0061; C08J 2329/04; C08J 2323/08; C08K 3/346; B65D 81/20; B65D 85/72
USPC .................. 524/445–450; 426/118, 127, 131
See application file for complete search history.

(56) References Cited

U.S. PATENT DOCUMENTS

| | | | |
|---|---|---|---|
| 6,225,394 B1 * | 5/2001 | Lan et al. ...................... | 524/445 |
| 6,376,591 B1 * | 4/2002 | Lan et al. ...................... | 524/445 |
| 8,268,108 B2 * | 9/2012 | Illsley et al. .................. | 156/242 |
| 2002/0022678 A1 * | 2/2002 | Lan et al. ...................... | 523/202 |
| 2002/0054969 A1 | 5/2002 | Clarke et al. | |
| 2003/0013796 A1 * | 1/2003 | Turner et al. ................. | 524/445 |
| 2006/0122311 A1 * | 6/2006 | Kim et al. ..................... | 524/445 |
| 2007/0106005 A1 * | 5/2007 | Bourgeois ............... | C01B 33/44 524/445 |
| 2007/0154668 A1 * | 7/2007 | Rhee et al. .................. | 428/35.7 |
| 2007/0292644 A1 * | 12/2007 | Carrus et al. ................. | 428/35.7 |
| 2008/0274350 A1 * | 11/2008 | Matsuoka et al. ............ | 428/334 |
| 2009/0117399 A1 * | 5/2009 | Frecka .................... | B32B 27/08 428/474.7 |
| 2009/0143503 A1 * | 6/2009 | Romero-Nochebuena et al. ............... | 524/52 |
| 2009/0220717 A1 * | 9/2009 | Wilczak et al. ............. | 428/36.6 |
| 2010/0239852 A1 * | 9/2010 | Okuzu et al. ................. | 428/328 |
| 2010/0289172 A1 * | 11/2010 | Fujimura et al. ............. | 264/148 |
| 2012/0231188 A1 * | 9/2012 | Illsley et al. .................. | 428/34.8 |

FOREIGN PATENT DOCUMENTS

| | | |
|---|---|---|
| EP | 0 796 885 A2 | 9/1997 |
| EP | 1538127 A1 | 6/2005 |
| EP | 1666637 A1 | 6/2006 |
| WO | WO 2007/058869 A2 | 5/2007 |
| WO | WO 2007/062391 A2 | 5/2007 |
| WO | WO 2009/027648 A1 | 3/2009 |
| WO | WO 2009027648 A1 * | 3/2009 |
| WO | WO 2009/098463 A1 | 8/2009 |

* cited by examiner

CARBON DIOXIDE BARRIER COATING

This application is a National Stage Application of PCT/GB2011/051670, filed on Sep. 7, 2011, which claims priority to U.S. Provisional Application Nos. 61/380,357 and 61/423,370, filed Sep. 7, 2010 and Dec. 15, 2010, respectively, all of which are hereby incorporated by reference for all purposes as if fully set forth herein.

FIELD OF THE INVENTION

The present invention relates to gas barrier coatings, having the ability to block the passage of carbon dioxide and which may be used to coat and impart gas barrier properties to a variety of materials, notably packaging for foods and pharmaceuticals. The coating of the invention may be particularly useful for use in packaging where retention of carbon dioxide within the packaging is desirable.

BACKGROUND

Synthetic plastics materials have long been used for the packaging of foods and other materials which need protection from handling and from moisture. In recent years, it has become appreciated that, in addition, many foods and other sensitive materials benefit from being protected from atmospheric oxygen. However, many foodstuffs are packaged in modified atmospheres which are rich in carbon dioxide which acts as a biocide. Therefore, it is also important to reduce the rate of diffusion of the carbon dioxide from the package so that the quality of the packaged good is maintained. Furthermore, carbon dioxide barrier coatings could be used to preserve the quality of carbonated drinks bottled in plastic packaging by reducing the rate of decarbonation of the drink.

A wide variety of multilayer laminate structures have been developed to provide barrier properties and other performance characteristics suited to a pack's purpose. These laminates may be any combination of plastic, metal or cellulosic substrates, and may include one or more coating or adhesive layers. Laminates which include polymeric films having metals or inorganic compounds, such as silicon oxides, deposited thereon have been found to give good general barrier properties and are widely used. Moreover, the inorganic layer of these types of laminate is rather brittle and may crack or break when the laminate is flexed, resulting in a loss of the gas barrier properties.

A number of technologies exist which provide a barrier to carbon dioxide diffusion when applied to plastic or other substrates. DE 3518875A1, JP59054557A, and P. Dehassus in 'Modern Plastics' (1983), 60 (1), 86-88 all describe how PVDC coatings can be applied to PET bottles, intended for carbonated drinks, to reduce the rate of carbon dioxide diffusion. In the latter reference a reduction in $CO_2$ migration from 0.89 $cm^3$/day to 0.34 $cm^3$/day was reported for a coated bottle.

The use of vapour deposition techniques to apply silicon oxide, aluminium oxide and aluminium layers to film surfaces is well known and excellent barriers to a range of gases, including $CO_2$ are possible. R. Davis, in Annual Technical Conference Proceedings—Society of Vacuum Coaters (1998), $41^{st}$. 505-506 reported that the $CO_2$ and other gas barrier of PET films coated with such layers was improved by a factor of approximately 10 times. Other instances of vapour deposited coatings providing barrier to carbon dioxide include WO2010065966A2 (atomic layer deposition method), C. Birchler; Fraunhofer-Institut fur Lebensmitteltechnologie and Verpackung, Munich, Germany. Coating (1994), 27 (8), 274-280, EP470777.

The use of lithium and potassium copolysilicate based coatings in providing $CO_2$ barrier when applied to plastic films has also been reported in U.S. Pat. No. 5,882,798A.

E. Palasset in Fr. Caoutchoucs & Plastiques (2000), 77 (784), 42-43, describes how PET bottles can be coated with a composition containing an epoxy resin to improve their $CO_2$ barrier properties. WO 95/26997A1 describes how beverage bottles can have their $CO_2$ barrier improved by the application of coatings containing an epoxy-amine adduct. The use of acrylic polymers in providing $CO_2$ barriers has also been reported in CN10160823A.

Instances of PVA (polyvinyl alcohol—also referred to as PVOH) and EVOH (ethylene-vinyl alcohol copolymer) being used to provide barrier to $CO_2$ include GB2337470A and WO2009070800A1. In the latter reference a solution of PVA was blended with water-dispersible acrylate monomers and a UV photoinitiator. After application to a PET bottle the composition was UV-cured to provide not only improved $CO_2$ barrier, but also improved water resistance to the coating.

Also worth noting here is the use of sol-gel type compositions comprising solutions of PVA/EVOH and hydrolysed alkoxy-silanes applied to the surface of the inorganic layer (silicon oxide, aluminium oxide or aluminium) of a pre-coated film to further improve the gas barrier performance of the coated film. These coatings not only enhance the barrier performance of the inorganic layer but also provide a degree of protection during printing and lamination. Layers of the inorganic coatings are very fragile and have poor flex resistance. However, including these sol-gel coatings confers a degree of improved barrier performance after these types of laminates have been flexed or folded. Specific references reporting the use of such protective coatings in improving the $CO_2$ barrier performance of coated films include JP2008080540A. The use of coatings containing PVA/EVOH and hydrolysed alkoxy-silanes applied to plastic films having no pre-existing inorganic barrier layer, and providing a $CO_2$ barrier, has also been reported by M. Minelli in Polym. Eng. Sci. (2010), 50 (1), 144-153, where it was reported that the $CO_2$ transmission rates through films such as PET and OPP could be reduced by over 100 times.

More recently, oxygen gas barrier coatings comprising dispersed clay, especially nanoparticles, and a hydrophilic polymer, such as polyvinyl alcohol (PVA) or ethylene-vinyl alcohol copolymer (EVOH), have been used, as described, for example, in U.S. Pat. No. 6,599,622, EP 0 590 263, JP01313536A2, JP2007-136984, EP 0 479 031, U.S. Pat. No. 4,818,782, WO 2009/027648A1 and WO 2009/098463A1.

JP 11-246729 discloses a resin composition containing polyvinyl alcohol, a water-soluble polyacrylic acid system compound, and an inorganic laminar compound for use as a gas barrier coating. U.S. Pat. No. 6,709,735 B2/EP 1 451 008 B1 and U.S. Pat. No. 6,991,837 B2 similarly disclose the use of compositions of PVOH and copolymers of acrylic acid and maleic acid with a molecular weight of from about 3500 to about 5000 to prepare oxygen barrier coatings.

SUMMARY OF THE INVENTION

It is to be understood that features of described herein with respect of any aspect of the invention may also be present in other aspects of the invention where appropriate.

It has now been found that coatings comprising a dispersion of EVOH and a dispersion of clay may be used as carbon dioxide gas barrier coatings. The coatings described herein typically provide excellent carbon dioxide barrier performance, particularly when applied at less than 1.0 g/m² dry film weight. The coatings also allow for good lamination bond strengths in adhesively formed laminates, particularly in PET-PE structures, and do not require the use of any primer. It has been found that coatings of the invention that include EVOH and a dispersion of clay typically provide good carbon dioxide barrier properties at high relative humidity, for example at a humidity of at least about 50% RH. It have been found that such barrier coating may provide $CO_2$ barrier improvements in excess of 100 times, and in some cases up to 500 times.

The invention provides a carbon dioxide barrier coating comprising EVOH and clay (hereinafter the "coating of the invention"), wherein the clay is dispersed in the EVOH. The invention further provides a process of preparing a carbon dioxide coating composition comprising the step of mixing (i) a polymer composition, comprising a solution or dispersion of EVOH and, optionally, further polymers such as PVOH, with (ii) a dispersion of clay. The clay is typically dispersed in a suitable liquid vehicle, such as water, a water-miscible solvent or a mixture thereof, and then mixed with a polymer composition. The carbon dioxide barrier coating is typically prepared by drying a layer of a carbon dioxide barrier coating composition. The layer if the coating composition is typically prepared by applying a layer of a coating composition onto a substrate. In one embodiment, the invention provides a process of preparing a carbon dioxide barrier coating composition, comprising the steps of dispersing clay using a high shear dispersion apparatus; and then of mixing (i) a polymer composition comprising a solution or dispersion of EVOH copolymer and a solution or dispersion of polycarboxylic acid polymer with (ii) the dispersion of clay.

According to one aspect, the invention provides the use of a coating comprising EVOH, and clay as a carbon dioxide barrier. In particular, the invention provides the use of a coating composition prepared by mixing (i) a polymer composition, comprising a solution or dispersion of EVOH with (ii) a dispersion of clay to enhance the carbon dioxide barrier properties of a substrate, i.e relative to the carbon dioxide barrier properties of the substrate without the coating composition, wherein the coating composition is applied to the substrate to form a barrier coating.

The invention further provides a carbon dioxide barrier coating composition comprising a solution or dispersion of EVOH, optionally PVOH and optionally further polymers, and a dispersion of clay (hereinafter, the "coating composition of the invention"). In one aspect, the invention provides a two-pack carbon dioxide barrier coating composition comprising a solution or dispersion of polymers, including EVOH and optionally further polymers, in a first pack and a dispersion of clay in a second pack.

Advantageously, the coating of the invention is used to enhance the carbon dioxide gas barrier properties of a substrate. According to another aspect, the invention provides a method of enhancing the carbon dioxide gas barrier properties of a material including a substrate comprising the step of coating the substrate with a layer of the coating of the invention.

In a further aspect, the invention provides a method of preparing a carbon dioxide barrier material comprising the step of applying the composition of the invention to the substrate. In particular, the invention provides a method of preparing a carbon dioxide barrier material, comprising a barrier coating on a substrate, the method comprising the step of applying a coating composition onto the substrate to form the barrier coating on the substrate and enhance the carbon dioxide barrier properties of the substrate, wherein the coating composition is prepared by mixing (i) a polymer composition, comprising a solution or dispersion of EVOH with (ii) a dispersion of clay. The method may further provide the step of selecting a substrate for which enhanced carbon dioxide barrier properties are desired, for example a substrate for use in a packaging for packaging an article in a carbon dioxide rich environment, and then applying the coating composition on that substrate. In one aspect, the substrate is coated with a layer of the coating of the invention. The method typically includes the step of drying the coating composition to provide the barrier coating.

In one aspect, the invention provides a method of preparing a $CO_2$ barrier material including a substrate and/or a method of enhancing the $CO_2$ barrier properties of a material including a substrate, comprising (1) preparing a $CO_2$ barrier coating composition by a process including the step of mixing (i) a polymer composition, including a solution or dispersion of EVOH, optionally PVOH and optionally further polymers, with (ii) a dispersion of a clay; and (2) applying the coating composition to the substrate. In a further aspect, the invention provides a gas barrier material obtained using the above methods.

In another aspect, the invention further provides a packaged article packaged in a carbon dioxide rich environment, or a packaged carbonated liquid, wherein the packaging comprises a barrier material prepared according to the method of the invention. The packaged article is an article that is advantageously packages in a carbon dioxide rich environment. For example, the article may be a foodstuff, pharmaceutical or other material that benefits from being sorted in such as environment and, for example, is protected from spoilage, has its shelf life prolonged and/or has its deterioration delayed by being packed in a carbon dioxide rich environment.

In a further aspect, the invention provides a method of protecting an article, for example protecting the article from spoilage, prolonging the shelf life of an article and/or delaying deterioration of an article comprising packaging the article in a carbon dioxide rich environment in a package that comprises a carbon dioxide barrier material prepared in accordance with the method of the invention.

DETAILED DESCRIPTION

Figure 1:
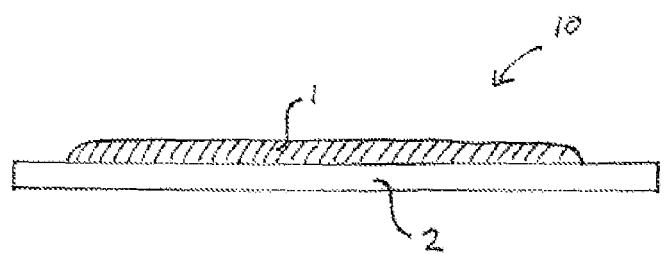
FIG. 1 shows a carbon dioxide barrier material of the invention.

The coating composition typically includes a liquid vehicle, for example an aqueous vehicle. The step of coating the substrate also typically comprises the further step of drying the coating composition, for example, by removing any liquid vehicle present in the coating composition, to provide a dry coating. The EVOH and optional further polymers is typically dispersed or dissolved in the liquid vehicle and the clay is typically dispersed in the liquid vehicle. The liquid vehicle typically comprises water and, optionally, one or more water-miscible solvents, for example a polar protic solvent, such as an alcohol. Advantageously, the coating composition comprises an aqueous dispersion of EVOH and clay.

In one aspect, the invention provides a process of preparing the coating composition of invention by mixing (i) a polymer composition, comprising a solution or dispersion of EVOH and further, optional, polymers, with (ii) a dispersion of clay. A liquid vehicle in which the EVOH is dispersed or dissolved may be the same or different as a liquid vehicle in which the clay is dispersed prior to mixing. In one aspect, the invention provides a process of preparing a carbon dioxide barrier material, comprises preparing the coating composition of the invention, and then, within 24 hours of completing the mixing, carrying out the step: a. of coating a substrate with the resulting mixture. Advantageously, step a. is carried out within 12 hours, for example, 6 hours, especially 2 hours of completing the mixing. Advantageously, a polymer composition, comprising the solution or dispersion of EVOH is blended with the dispersion of clay. The method of enhancing the carbon dioxide barrier properties of a substrate and/or the method of preparing a carbon dioxide barrier material of the invention may, optionally, include the process of preparing the carbon dioxide barrier composition as a first step.

The term "polymers" as used herein refers to both polymer and copolymers and also polymeric resins.

The terms "dispersed clay" or "dispersion of clay" as used herein refer to a clay that is substantially intercalated or exfoliated during the dispersion process. In contrast, a clay which is merely slurried in a liquid is not substantially intercalated or exfoliated and substantial amounts of the clay will remain as a layered material. The person skilled in the art will be able to ascertain whether a clay is substantially fully exfoliated and distributed in a liquid using known techniques such as analysis under high magnification, x-ray diffraction or particle size analysis. A particularly suitable method for confirming that the clay has been substantially fully dispersed is to cast a sample of a coating prepared using the dispersion onto a copper grid and inspect the sample using a transmission electron microscope.

A further particularly suitable method for confirming that a dispersed clay has been achieved is by disc ultracentrifuge particle size analysis. Particle size analysis can be used to confirm that a clay is dispersed by measuring the peak particle diameter of a sample of clay distributed in a liquid. The peak particle diameter is the most abundant maximum particle size, by relative weight of the particles. Where particles are non-spherical, the "diameter" of the particles is the maximum dimension. The peak particle diameter corresponding to a dispersed clay will vary depending on the type and source of clay used. In one embodiment, the dispersion of a clay sample for use the process of the invention has a peak clay particle diameter of no more than 115% preferably no more than about 110%, especially no more than about 108% of that of the peak particle diameter obtained using the following procedure:

25 g of clay is pre-slurried in 120 g of ethanol using an overhead paddle stirrer. This clay slurry is then transferred to a Silverson L4R laboratory vortex blender, equipped with a 1 mm screen. 350 g of water is added to the slurry. Once the addition of water is complete the power setting is increased to 50%, and the clay is then dispersed for 45 minutes. The power setting is then reduced to 25% and 60 g of ethanol is added. After 5 minutes further stirring the dispersion is discharged.

The peak particle size may be measured using any standard technique, for example be measured using a CPS DC24000 disc ultracentrifuge particle size analysis instrument, for example using the procedure described for Example 4 below.

It has been found that the level of dispersion of a clay in a coating composition correlates to the haze that a layer of coating produced when applied to a clear substrate, especially a clear colourless, plastics substrate such as a PET film. In one embodiment the coating compositions of the invention provide a haze value of less than about 32%, preferably less than about 24% and especially less than about 20% when applied as a wet film weight of 24 gsm to polyester film and then dried. The haze value may be obtained using any standard apparatus such as a Byk-Gardener Haze-gard dual apparatus. The polyester film is, for example, a corona treated 12 μm thick polyester film, such as a Mylar 800 film.

In one aspect, the invention provides a carbon dioxide barrier material comprising a layer of the coating of the invention on a substrate (hereinafter a "barrier material of the invention"). The carbon dioxide barrier material is advantageously prepared in accordance with the method of the invention.

In one aspect of the invention, the coating is applied to a substrate such that:

$$X = A/(B \cdot C) > 100,$$

in which:
A=Carbon Dioxide Transmission Rate for the substrate at 23° C. and 0% RH without the coating;
B=Carbon Dioxide Transmission Rate for the substrate at 23° C. and 0% RH with the coating; and
C=Coating Weight in $g/m^2$ (dry).

In a further embodiment, there is provided a carbon dioxide barrier material that meets the above conditions at 50% RH, i.e. the when the carbon dioxide transmission rate for the substrate with and without the coating are measured at 23° C. and 50% RH.

It has been found that gas barrier coatings comprising a dispersion of a clay and EVOH may provide acceptable $CO_2$ barrier properties at relatively low coating thicknesses, for example, coating weights (C) of about 1.0 $g/m^2$ or less. In one aspect, the invention relates to the surprising realisation that a gas barrier coating that meets the above conditions can be achieved using conventional dispersion apparatus, such as high shear mixing apparatus, if the clay is dispersed in a liquid vehicle prior to combining with a polymer composition.

The component A/B is essentially a 'barrier enhancement' factor; the ratio of carbon dioxide transfer rates achieved without, and with, the barrier coating. This factor is preferably greater than 75, especially greater than 100. In some embodiments the factor is 200 or higher. In one embodiment the rate of carbon dioxide transmission (in $cm^3/m^2/day$) of the substrate is decreased to 1.3% or less, for example to 1.0% or less and in some embodiments the rate is decreased to 0.5% or less following application of the coating composition of the invention. The carbon dioxide transfer rate in $cm^3/m^2/day$ is measured at 23° C. and 0% relative humidity (RH) by any standard method known the skilled person. For example, suitable ASTM standard test methods include:

F2476 Test Method for the Determination of Carbon Dioxide Gas Transmission Rate ($CO_2$ TR) Through Barrier Materials Using An Infrared Detector.

Typically, the maximum dry film weight of the coating of the invention is about 1.5 $g/m^2$. Preferably, acceptable carbon dioxide barrier properties are achieved using dry film weights of about 1.0 $g/m^2$ or less. It has found that acceptable carbon dioxide barrier properties are typically achieved using dry film weights of less than 1.0 g/m². In one aspect of the invention, C<1.0 g/m². In a further embodiment, C<0.8 g/m². In one embodiment, the coating composition of the invention is applied to a dry coating weight of less than about 1.5 g/m², especially less than about 1.0 g/m², for example about 0.8 g/m² or less.

In one embodiment the material comprising the substrate is a lamella. The lamella may, for example, include a single ply of a substrate or a laminate. In one embodiment, the substrate is a plastics material, for example, a flexible plastics film. In another embodiment, the substrate is a polymer film, for example, a flexible polymer film. The substrate may, optionally, comprise more than one layer of material and may itself be a laminate, for example, a composite laminate. In one embodiment the material comprising the substrate is a laminate material in which the substrate is a film in a laminate.

In one embodiment, the invention provides the use of a coating of the invention as a carbon dioxide barrier layer in a laminate material, such as a composite laminate. In a further embodiment, the invention provides the use of a coating of the invention clay to enhance the carbon dioxide gas barrier properties of a laminate material. In one embodiment, the laminate material is an adhesively formed laminate comprising a first film adhered to a second film. Advantageously, the coating of the invention is present between the first and the second films. In another aspect, the invention provides a method of enhancing the carbon dioxide gas barrier properties of a laminate material, or a method of preparing a carbon dioxide barrier laminate material, comprising the steps: a. coating a first film with a layer of the coating of the invention; b. applying an adhesive coating to either or both of the coated side of the first film or to a second film; and c. adhering the first and the second films together. The step of coating of the first film typically includes the step of applying the coating composition of the invention to a first film. Any liquid vehicle present in the coating composition is typically removed subsequent to the step of applying the coating composition of the invention to a first film and prior to step c. When the adhesive is applied to the coated film in step b., any liquid vehicle present is generally removed prior to step b. to form a dry coating. In a further embodiment the invention provides a process of preparing a carbon dioxide barrier laminate material, comprising mixing a solution or dispersion of EVOH with a dispersion of clay and according to the process described above and then: a. coating a first film with the resulting mixture; b. applying an adhesive coating to either or both of the coated side of the first film or to a second film; and c. adhering the first and second films together. Where the adhesive is applied to the second film only, steps a. and b. may be carried out in any order. Step c, in any event, is carried out after steps a. and b. Advantageously, the first and second films are films of plastics material, for example, flexible plastics material. The films may, optionally, be a polymer, for example, a flexible polymer. The first and second films may be the same as each other or may be different. For example the films may be of the same material or of different materials.

In one aspect, the invention provides, a laminate carbon dioxide barrier material comprising a layer of the coating of the invention between two films. In one embodiment, the laminate material comprises at least two films having there between an adhesive layer and a layer of the coating of the invention. In one aspect, the invention provides a carbon dioxide barrier laminate material prepared in accordance with a process of the invention.

Advantageously, the bond strength between the two films of the laminate material is at least about 1.0 N/15 mm, preferably at least about 1.5 N/15 mm, after the adhesive has fully cured.

In one embodiment the invention provides a carbon dioxide barrier laminate material comprising a first film coated with a layer of the coating of the invention, the coated side of first flexible polymer film being adhered to a second film via a layer of adhesive, in which:

$$X=A/(B \cdot C)>100$$

wherein:
A=Carbon Dioxide Transmission Rate for the laminate at 23° C. and 0% RH without the coating;
B=Carbon Dioxide Transmission Rate for the laminate at 23° C. and 0% RH with the coating;
C=Coating Weight in g/m² (dry).

In one embodiment the invention provides a carbon dioxide barrier laminate material comprising a first film coated with a layer of the coating of the invention, the coated side of first flexible polymer film being adhered to a second film via a layer of adhesive, in which:

$$X=(A \cdot D)/(B \cdot C)>200$$

wherein:
A=Carbon Dioxide Transmission Rate for the laminate at 23° C. and 0% RH without the coating;
B=Carbon Dioxide Transmission Rate for the laminate at 23° C. and 0% RH with the coating;
C=Coating Weight in g/m² (dry);
D is the bond strength (N/15 mm).

Advantageously, the above condition is met when A/B>75, C<1.5 and/or D>1.0, especially when A/B>75, C<1.5 and D>1.0.

In a further embodiment, there is a provided a carbon dioxide barrier laminate material that meets the above conditions at 50% RH.

In one aspect, the invention relates to the surprising realisation that a carbon dioxide barrier coating that meets the above conditions can be achieved using conventional dispersion apparatus, such as high shear mixing apparatus, if the clay is dispersed in a liquid vehicle prior to combining with a polymer composition.

In one aspect the invention provides a packaged article, such as a packaged foodstuff, pharmaceutical, or other material packaged in a carbon dioxide-rich environment, wherein the packaging comprises a barrier material of the invention. A carbon dioxide-rich environment is an environment in which carbon dioxide constitutes greater than 0.0387% by volume of the gases present. In some embodiments the carbon dioxide-rich environment is an environment in which carbon dioxide is present at a level of at least about 0.1% by volume, especially at least 1% by volume, for example at least about 5% by volume of the total volume of gases present. In some embodiments the carbon dioxide-rich environment is an environment in which carbon dioxide is present at a level of at least about 10% by volume, especially at least 20% by volume, for example at least about 50% by volume of the total volume of the gases present. Levels of carbon dioxide of 5% by volume or higher are typically effective as a biocide. In a further embodiment, the invention provides a packaged carbonated liquid, wherein the packaging comprises a carbon dioxide barrier material according to the invention. Advantageously, the carbonated liquid is an aqueous liquid comprising at least 0.1% dissolved carbon dioxide by weight, preferably at least about 0.2% by weight, especially at least about 0.5%, for example at least about 1.0% dissolved carbon dioxide by weight. Carbonated drinks typically include $CO_2$ dissolved at levels of from about 0.2% to about 1.5% by weight.

In one aspect, the invention provides a method of protecting an article from spoilage, prolonging the shelf life of an article and/or delay deterioration of an article comprising packaging the article in a package that includes a carbon dioxide barrier material of the invention. In one embodiment, there is provided the use of a carbon dioxide barrier material of the invention as a packaging material for packaging an article to protect against spoilage of the article, prolong the shelf life of the article and/or delay deterioration of the article. In one embodiment, the article is a food product, a pharmaceutical or other article that is preserved by packaging in a $CO_2$ enriched environment. In a further embodiment, the article is a carbonated liquid, such as a carbonated drink.

The clay used is preferably nanoparticulate. A nanoparticulate clay is a clay with particles having at least one dimension in the nanometer range, i.e. of less than 100 nm. The clay dimension which is within this nanoscale domain is the thickness of the individual clay lamellae. Typically nanoparticulate clay particles have a maximum thickness dimension of less than 100 nm, for example a maximum thickness dimension of less than 50 nm, such as a maximum thickness dimension of less than 20 nm. Also preferably a portion of the clay mineral has been intercalated or exfoliated during the dispersion process. There is no restriction on the type of clay used in this invention provided it is sufficiently dispersible in an aqueous medium and that it is capable of being intercalated or exfoliated during dispersion. A degree of exfoliation of the mineral lamellae of a clay has been found to be required to provide the maximum barrier performance. In an exfoliated form, the aspect ratio of the clay (i.e. the ratio between the length and thickness of a single clay 'sheet') will have an impact on the level of carbon dioxide barrier achieved. The greater the aspect ratio, the more the rate of carbon dioxide diffusion through the dry coating and laminate will be reduced. Advantageously, the clay (in its exfoliated form) has an aspect ratio greater than about 20. Clay minerals with aspect ratios between 20 and 10,000 are preferably used. Particularly preferred are those minerals having an aspect ratio greater than 100. Examples of suitable clays include kaolinite, montmorillonite, atapulgite, illite, bentonite, halloysite, kaolin, mica, vermiculite, diatomaceous earth and fuller's earth, calcined aluminium silicate, hydrated aluminium silicate, magnesium aluminium silicate, sodium silicate and magnesium silicate. Commercial examples of suitable materials are Cloisite Na+ (available from Southern Clay), Bentone ND (available from Elementis). Of these, the clays, especially the montmorillonite clays, are preferred, nanoparticulate clays being most preferred.

The clay content of the coating compositions of the invention may, for example, be in the range of from about 5 wt % to about 70 wt %, especially from about 5 wt % to about 50 wt %, based on the total solid content of the coating. Advantageously, the coating compositions of the invention include about 20% by weight (wt %) or more clay, based on the total solid content of the coating. Preferably, the coating compositions of the invention include about 20 wt % or more, especially about 30 wt % or more, clay, based on the total solid content of the coating. In some embodiments, the coatings comprise about 35 wt % or more clay, especially about 37 wt % or more, for example about 40 wt % or more clay, such as about 45 wt % or more clay based on the total solid content of the coating. Particularly good carbon dioxide barrier properties have been observed when clay contents of at least 37 wt % have been used. It has been found that with the coatings of the present invention, good bond strengths can be maintained as the clay concentration increases. In particular, good bond strengths have been observed with the coatings of the present invention having clay contents of from about 35 wt % to at least about 50 wt % based on the total solid content of the coating. For example, in PET-PE laminates, good bond strengths have been obtained with coating compositions comprising up to at least 47.5 wt % of clay based upon the total solid content of the coating. Advantageously, the coating of the invention includes no more than about 60 wt % clay, such as no more than about 55 wt % clay, for example no more than about 50 wt % clay based on the total solid content of the coating. In one embodiment, the coating of the invention has a clay content of from about 30 wt % to about 55 wt %, for example from about 35 wt % to about 50 wt % based on the total solid content of the coating. A preferred technique in the preparation of the coating composition is to prepare the clay dispersion via a separate process, for example using high shear dispersion apparatus, before blending this dispersion with a polymer composition comprising a solution or dispersion of the EVOH and, optionally, further polymers. Advantageously, the clay dispersion is made using conventional high shear dispersion apparatus, for example a vortex, cavitation or bead mill type, especially a vortex type, high shear dispersion apparatus. Advantageously, the clay is dispersed in water and/or a water-soluble alcohol. Advantageously, the clay is dispersed in the presence of water and a water-miscible organic solvent such as a water-soluble alcohol. High shear dispersion apparatus, such as vortex and cavitation types, are common to the coatings industry. It has been found that when a coating is prepared by dispersing the clay in situ with the polymer composition comprising EVOH and/or any optional further polymers, the clay dispersion in the resulting composition is unstable, with the clay settling out with time. Thus, conventional dispersion apparatus will not produce adequate coatings via a 1-pot process. Without wishing to be bound by any theory, it is believed that in order to provide the required $CO_2$ barrier performance, the inclusion of well dispersed clay is required.

There is no particular restriction on the nature of the EVOH and optional PVOH, used in the present invention, provided that it can form a solution or dispersion in a suitable liquid vehicle such as an aqueous medium. Such polymers have a high proportion of free hydroxy groups which can form hydrogen bonds with salt groups in a metal silicate or other constituent of a clay and thus serve as a dispersing agent for the clay. Examples of such polymers are described in, for example, U.S. Pat. No. 6,599,622 or EP00590263B1, the disclosure of which is incorporated herein by reference. Fully hydrolysed grades of EVOH and/or PVOH polymers, such as the PVOH Mowiol 4-98 supplied by Kuraray America, Inc., have been found to be particularly useful. Advantageously, the polymer composition includes EVOH and PVOH.

Advantageously, the coating of the invention includes about 20 wt % or more PVOH/EVOH, for example about 25 wt % or more, especially about 30 wt % or more PVOH/ EVOH based on the total solid content of the coating. Advantageously, the coating of the invention includes no more than about 90 wt %, such as no more than about 75 wt %, PVOH/EVOH, for example no more than about 70 wt %, especially no more than about 60 wt % PVOH/EVOH based on the total solid content of the coating. Advantageously, the coating of the invention has a PVOH/EVOH content of from about 30 to about 90 wt %, for example from about 30 to about 75 wt %, based on the total solid content of the coating. In one embodiment, the coating of the invention has a PVOH/EVOH content of from about 25 wt % to about 65 wt %, for example from about 30 wt % to about 60 wt % based on the total solid content of the coating. The PVOH/EVOH content refers to the content of EVOH and any optional PVOH present in the composition, i.e. to the content of EVOH alone when no PVOH is present, and to the combined EVOH and PVOH content when PVOH is present.

The gas barrier coating composition comprises a solution or dispersion, preferably a solution, of EVOH. In a further embodiment, EVOH is dispersed in the coating of the invention. Advantageously, the EVOH is a vinyl alcohol-ethylene copolymer where the ethylene content is less than 20 mol. %. Conventional EVOH, as used in the barrier coatings of JP 2007-136984, U.S. Pat. No. 4,818,782 and EP 0 479 031 mentioned above, has a molar concentration of ethylene of greater than 20%. It has been found that when the principal polymer component of the coatings described here is a vinyl alcohol-ethylene copolymers where the ethylene content is less than 20 mol. % (such as the range of EVOH available from Kuraray under the trade name 'Excevar'), a more stable solution is provided than when a conventional EVOH is used. Whereas conventional EVOH solutions are usually applied under elevated temperature to ensure clarity of the coating as it dries, it has been found that the coatings of the invention that include an EVOH where the ethylene content is less than 20 mol. % can be applied successfully under ambient conditions.

Advantageously, the compositions of the invention comprise polycarboxylic acid polymer(s). Preferably the polycarboxylic acid polymer(s) is included in the polymer composition used to prepare the coating compositions of the invention. The inclusion of the polycarboxylic acid polymer(s) has been found to enhance the performance of the coatings of the invention at high relative humidity. In particular, coatings of the invention that include polycarboxylic acid polymer(s) have been found to provide excellent barrier performance at high relative humidity (RH), allied with good lamination bond strengths in adhesively formed laminates, particularly in PET-PE structures. Furthermore, it has been found that excellent performance in adhesively formed laminates at elevated RH may be achieved using the coatings of the current invention without the need for any special additional primer layer. In one embodiment, there is provided a carbon dioxide barrier material or a carbon dioxide barrier laminate material that meets the above specified conditions, i.e. $X=A(B/C)>100$ and $C<1.0$, at a relative humidity of at least about 50% RH, for example at least about 75% RH.

Suitable polycarboxylic acid polymer(s) include homo- and copolymers of acids, typically unsaturated acids, for example ethylenically unsaturated acids, such as acrylic, methacrylic and maleic acid. In one embodiment, the polycarboxylic acid polymer is selected from poly(acrylic acid), poly(methacrylic acid) or copolymers thereof, or a copolymer of maleic acid with either acrylic or methacrylic acid, or blends thereof. In a further embodiment, the polycarboxylic acid polymer is poly(acrylic acid). There is no constraint on the molecular weight of the polycarboxylic acid polymer, so long as it is not so high that the viscosity of the coating becomes too high at useful solid contents to prevent application by either flexographic or gravure processes. Coatings of the current invention have been found to perform well with a range of polymeric acids and are not limited to low molecular weight copolymers of maleic acid and acrylic acid. For example, a coating prepared by the process of the current invention that includes a polymeric acid which is a copolymer of acrylic and methacrylic acid with a molecular weight of about 20,000 has been found to perform well. Advantageously, the polycarboxylic acid polymer has a molecular weight of less than about 300,000, for example, less than about 200,000, especially less than about 150,000. In a preferred embodiment, the polycarboxylic acid polymer is used in its predominantly non-neutralized form. Advantageously, the polycarboxylic acid polymer used is predominantly in the form of the free acid, for example, at least 50 mol. % of the carboxylic acid groups in the polymer are in the free acid form, especially at least 70 mol % and more especially at least 90 mol % of the carboxylic acid groups in the polymer are in the free acid form. It has been shown that partially or fully neutralized analogues in which substantial proportions of the acid moieties have been converted to salts may induce a deterioration of both gas barrier and laminate bond strength performance at high humidity. Advantageously, the pH of the polycarboxylic acid solution or dispersion used in the formation of the gas barrier coating compositions has a pH of about 4 or less, for example about 3.5 or less, especially about 3 or less. Typically, the polycarboxylic acid solution or dispersion has a solids content of from about 10 to about 50 wt %. In one embodiment, the gas barrier coating composition is substantially free of partially or fully neutralized polycarboxylic acid polymers. Preferably the gas barrier coating composition is prepared with substantially no basic components that are capable of forming salts with the polycarboxylic acid polymers.

Advantageously, the coating of the invention includes about 2 wt % or more polycarboxylic acid polymer, for example about 3 wt % or more, especially about 5 wt % or more polycarboxylic acid polymer based on the total solid content of the coating. Advantageously, the coating of the invention includes no more than about 50 wt % polycarboxylic acid polymer, such as no more than about 30 wt %, for example no more than about 25 wt %, especially no more than about 20 wt % polycarboxylic acid polymer based on the total solid content of the coating. In one embodiment, the coating of the invention has a polycarboxylic acid polymer content of from about 3 wt % to about 25 wt %, for example from about 5 wt % to about 20 wt % based on the total solid content of the coating.

It is envisaged that any and all of the levels of components of the coating compositions specified herein may be combined in embodiments of the invention. Non-limiting examples of combinations of ranges of levels of components are set out in this paragraph. In one embodiment, the coating of the invention has a clay content of from about 20 wt % to about 55 wt %, a polycarboxylic acid polymer content of from about 3 wt % to about 25 wt % and a PVOH/EVOH content of from about 25 wt % to about 65 wt % based on the total solid content of the coating. In another embodiment, the coating of the invention has a clay content of from about 5 wt % to about 50 wt %, a polycarboxylic acid polymer content of from about 5 wt % to about 20 wt % and a PVOH/EVOH content of from about 30 wt % to about 90 wt % based on the total solid content of the coating. In yet another embodiment, the coating of the invention has a clay content of from about 20 wt % to about 50 wt %, a polycarboxylic acid polymer content of from about 5 wt % to about 20 wt % and a PVOH/EVOH content of from about 30 wt % to about 60 wt % based on the total solid content of the coating. In a further embodiment, the coating of the invention has a clay content of from about 35 wt % to about 50 wt %, a polycarboxylic acid polymer content of from about 5 wt % to about 20 wt % and a PVOH/EVOH content of from about 30 wt % to about 60 wt % based on the total solid content of the coating.

The coatings of the invention typically have solid contents of at least about 0.5 wt %, preferably at least about 1 wt %, more preferably at least about 2 wt %. The coatings of the invention typically have solid contents of no more than about 15 wt %, preferably no more than about 10 wt %, more preferably no more than about 8 wt %. In one embodiment the coatings have a solid content from about 1 wt % to about 15 wt %, for example from about 3 wt % to about 9 wt %.

The coating composition is typically applied in the form of dispersion of the clay and a dispersion or solution of polymer(s) in a suitable liquid vehicle. The vehicle is preferably aqueous, and is more preferably water, optionally containing a small quantity of a miscible co-solvent, such as an alcohol (for example ethanol, n-propanol or isopropanol) or a ketone (such as acetone). Where a co-solvent is present, this can be up to 75% (w/w) of the total composition. However, it is preferred that the content of the co-solvent is less than 50%, more preferably less than 50% of the entire composition. The preferred co-solvent is an alcohol, preferably n-propanol, ethanol or isopropanol.

If desired, in addition to the EVOH, optional PVOH and optional polycarboxylic acid polymer, other polymers or resins may be included in the coating composition, provided these co-resins are themselves compatible in the final composition. Examples of such polymers and resins include solution acrylics, acrylic emulsions, polyesters, alkyds, sulphopolyesters, polyurethanes, vinyl acetate emulsions, poly (vinyl butyral), poly(vinyl pyrrolidone), polyamides, polysaccharides, proteins, epoxies, etc. It is also possible to include sol-gel precursors in these compositions, e.g. a hydrolysate of tetraethyl orthosilicate. In one embodiment, the coating composition comprises a poly(ethyleneimine). In one embodiment, the coating composition is advantageously supplied to the customer as a single composition. In an alternative embodiment the coating material is supplied to the customer as a two pack composition, one pack comprising a solution or dispersion of a polymer composition comprising EVOH and any other optional polymers such as PVOH and/or polycarboxylic acid polymer, and the other comprising an aqueous dispersion of a clay. In one embodiment, the coating is to be supplied to the customer as a two pack, the first part containing the dispersed clay, the second an aqueous solution of the EVOH and optionally other soluble and/or dispersed resins. These coatings can be applied by conventional printing methods, in particular flexographic and gravure printing methods. They do not require specialized equipment, as is the case with PVDC-coated films or ceramic-coated films. Furthermore, the coating compositions of the invention are readily prepared from a two pack composition press-side by simply mixing or blending the polymer composition comprising a solution or dispersion of EVOH and any further optional polymers, and the aqueous dispersion of a clay together.

The time taken for the adhesive to cure fully will vary depending on the nature of the adhesive and will be well known to those skilled in the field. For example, it can take up to 10 days at room temperature with conventional isocyanate-based adhesives, and up to 10 days at 50° C. with aliphatic isocyanate 2-pack types.

The overall solids content of the coating composition of the invention is typically at least about 0.5% (w/w), preferably at least about 1% (w/w); more preferably at least about 2% (w/w) and especially at least about 3% (w/w). The overall solids content of the coating composition is typically no more than about from 15% (w/w), preferably no more than about from 9% (w/w) and especially no more than about 8% (w/w). The relatively low solids content of the coating composition, has been found to delay or prevent the premature onset of gelation of the coating, which results from the build up of structure held in place by weak electrostatic charges.

The amount of polymer (total of EVOH and optional polymers and resins) in the coating composition of the invention is typically from 40 to 95% of the total solids comprising polymer and clay, for example from 50 to 90%. In other words, the ratio of clay to polymer is typically from about 1.5:1 to about 1:19, for example from about 1:1 to about 1:9. Advantageously, the amount of clay in the coating composition is from about 3 to about 70% (w/w), typically from about 20 to about 50% (w/w), especially from about 35 to about 45% (w/w) of the total solids comprising polymer and clay. In other words, the ratio of clay to polymer is advantageously from about 1:5 to about 5:9, especially from about 5:7 to about 5:9. The concentration of clay and polymer in the coating composition will depend on their solubility/dispersability and the way in which the coating will be applied (gravure, flexo, curtain coating, roll coating, dip coating, spray, etc.), the amount of solvent employed preferably being the minimum needed to achieve sufficient flowability to coat the substrate adequately. In general, the clay will be employed in the form of a 1.0-15% by weight solution/dispersion in water or water+co-solvent (prior to its addition to the EVOH containing component), and this will dictate the contents of the remaining components.

The coating composition of the present invention comprising the clay, the polymer solution or dispersion and, typically, a solvent therefore may be applied to a substrate by any conventional means. The solvent may then be removed, e.g. by heating, leaving a film comprising the clay dispersed through the polymer on the substrate. The resulting gas barrier material may then be adhered to a further flexible plastics sheet to form a laminate material if desired.

The thickness of the coating of the present invention will depend in part on the ability of the clay to form a continuous, coherent coating layer. However, in general, the coating should be from 50 nm to 3000 nm thick, for example from 200 to 2000 nm thick. The process of the invention advantageously enables the coating to be applied at an optimum thickness that provides adequate gas barrier properties without an unnecessarily thick coating being applied.

The coatings are applied at a wet film weight of less than 1.5 gsm (dry), especially 1.2 g/m$^2$ (dry) for example 1.0 g/m$^2$ dry. The process of the invention advantageously enables an optimum film weight to be applied. Film weight may be a more useful measure than film thickness due to the differing densities of polymers (for PVOH ca. 1.3) and the clay (for montmorillonite about 2.5).

There is no particular restriction on the nature of the substrate, although it is typically a flexible film, such as a plastics film, and any material suitable for the intended use may be employed. However, where the matter being packaged with the barrier material of the present invention is a foodstuff or pharmaceutical, it will normally be preferred that the plastics film or other substrate should be food grade. Examples of suitable materials include: polyolefins, such as polyethylene or polypropylene; polyesters, such as polyethylene terephthalate, polybutylene terephthalate or polyethylene naphthenate; polyamides, such as nylon-6 or nylon-66; and other polymers, such as polyvinyl chloride, polyimides, acrylic polymers, polystyrenes, celluloses, or polyvinylidene chloride. It is also possible to use copolymers of any compatible two or more of the monomers used to produce these polymers. Furthermore, coatings of the present invention may be included in adhesively formed laminates comprising paper substrates (such as polyester and polyolefin coated paperboards commonly encountered in food packaging). In one embodiment, the substrate is a polyester.

The present invention has been found to be particularly suitable for use with flexible plastic film substrates which have relatively poor inherent carbon dioxide barrier properties. In one embodiment, the carbon dioxide transfer rate of the substrate without the coating is at least 50 $cm^3/m^2/day$ at 23° C. at 0% RH, especially at least 80 $cm^3/m^2/day$ at 23° C. at 0% RH. In one embodiment, the carbon dioxide transfer rate of the substrate without the coating is at least 400 $cm^3/m^2/day$ at 23° C. at 0% RH. In a further embodiment, the carbon dioxide transfer rate of the substrate without the coating is at least 50 $cm^3/m^2/day$ at 23° C. at 50% RH, especially at least 80 $cm^3/m^2/day$ at 23° C. at 50% RH. In one embodiment, the carbon dioxide transfer rate of the substrate without the coating is at least 400 $cm^3/m^2/day$ at 23° C. at 50% RH.

The substrate is preferably treated by corona discharge immediately prior to its being coated with the composition of the present invention. This process is well known in the art and is described, for example, in "Plastics Finishing and Decoration", edited by Donatas Satas, published by Van Nostrand Reinhold Company in 1986, at pages 80-86. In the Examples hereafter, for the corona discharge treatment we achieved a surface energy greater than 50 Dynes/cm.

There is no particular restriction on the nature of the adhesive used to prepare the laminate materials and any adhesive commonly used for the adhesion of two or more plastics films may be employed in the present invention. Examples of suitable adhesives include solvent-based (polyurethane) types such as those from Henkel (Liofol UR3969/UR 6055, Liofol UR3640/UR6800, Liofol UR3894/UR6055), Rohm&Haas (Adcote 811/9L10) and Coim (CA2525/2526), Solvent-free polyurethane adhesives such as Liofol 7780/UR6082, UR7750/UR6071 from Henkel, and Mor-Free ELM-415A/Mor-Free CR140 from Rohm&Haas, can also be used. As well as polyurethane adhesives, epoxy-based types such as Lamal 408-40A/C5083 may be used. Waterborne adhesives, such as Aqualam 300A/300D, an epoxy type from Rohm&Haas may also be used.

The adhesive may be applied directly to one of the films and then adhered to the gas barrier coating on the other film, or it may be applied to the gas barrier coating on one film and then adhered to the other film. In any case, the order of layers will be: a film; the gas barrier coating; an adhesive; and another film. If desired, layers of other materials may be interposed between any two of these layers, or on either side of the 2 film substrates having the barrier coating between them.

It is to be understood that the features of described above may be present in any combination in the coating compositions, barrier coatings, uses, methods, packages etc. of the invention wherever applicable. For example, the coating composition may include about 20 wt % or more, especially about 30 wt % or more, clay based on the total solid content and the EVOH may be a is a vinyl alcohol-ethylene copolymer having an ethylene content of less than 20 mol. %. Such a composition may, for example be prepared using a clay dispersion prepared using a high shear dispersion apparatus.

The invention is further illustrated by the following non-limiting Examples:

Example 1

(a) A solution containing 1.2 parts of Mowiol 4-98, a polyvinyl alcohol, and 6.8 parts of Exceval AQ4104, an EVOH copolymer, (both supplied by Kuraray America, Inc.) in 20 parts of n-propanol and 72 parts of deionised water was prepared by heating, with stirring, the mixture to 80° C., until all the polymer had dissolved.

(b) A clay dispersion was prepared by blending 3 parts of Cloisite Na+ (ex. Southern Clay) in 30 parts of isopropanol and then adding 67 parts of deionised water. 500 g of a clay dispersion according to this formulation was prepared using a Dispermat CV laboratory cavitation type mixer equipped with a 4 cm blade, at a speed of 2500 rpm. The clay was dispersed for 45 minutes.

A coating was then prepared by blending 50 parts of (a) with 50 parts of (b) using a cavitation type mixer.

The coating was applied to corona discharge treated 12 micron Mylar 800 on a gravure press to achieve a dry film weight of approximately 0.28 $g/m^2$.

The carbon dioxide transmission rates of the coated sample and a control sample were determined on a Mocon Model C4/41 gas permeability tester at 23° C. and 0% relative humidity, according to ASTM F2476.

Example 2

(a) A solution containing 8.07 parts of Exceval AQ4104, 8.83 parts of Sokalan CP13s (a polycarboxylic acid, ex. BASF), 30 parts of n-propanol and 53.1 parts of deionised water was prepared by heating and mixing all the components, bar the Sokalan CP13s, until the polymer had dissolved. Once the solution had cooled the Sokalan CP13S was added.

(b) A clay dispersion was prepared by blending 4.0 parts of Cloisite Na+ (ex. Southern Clay) in 20 parts of ethanol and then adding 66 parts of deionised water to a total of 500 g. The clay was dispersed using a vortex type mixer (Silverson L4R), equipped with a 1 cm screen at 50% of the maximum power for 45 minutes. After 45 minutes, 10 pats of ethanol were added to the dispersion.

(c) A coating was then prepared by blending 33.3 parts of (a) with 66.7 parts of (b) using a cavitation type mixer.

The coating was applied to corona discharge treated Mylar 800 using both a gravure press and a flexo press to achieve the dry film weights and carbon dioxide transmission rates (CDTR) as detailed in Table 1.

TABLE 1

| Coating | Printing Process | Dry Film Weight ($g/m^2$) | CDTR ($cm^3/m^2/day$) 0% RH | X |
|---|---|---|---|---|
| None | — | 0 | 639.5 | — |
| 1 | gravure | 0.28 | 1.61 | 1420 |
| 2 | flexo | 0.24 | 2.81 | 948 |
| 2 | gravure | 0.30 | 1.36 | 1567 |
| 2 | gravure | 0.41 | 1.26 | 1238 |
| 2 | gravure | 0.70 | 2.81 | 325 |

The application of the coating reduced the rate of carbon dioxide transmission to between about 0.2 and 0.45% of that of the substrate without the coating.

Coating Compositions according to Examples 1 and 2 were also tested for their oxygen barrier. The coatings were applied to corona discharge treated Mylar 800 using a No. 1 K-Bar, which deposits a wet film thickness of 6 μm of the coating to the substrate, which equates to dry film weight of around 0.30 g/m². The oxygen barrier was determined using a Mocon Oxtran 2/21 at 23° C. and 75% relative humidity. The carbon dioxide and oxygen barriers of these coated film samples are shown in Table 2.

Example 3 (Comparative)

(a) A solution containing 8.0 parts of Mowiol 4-98 (supplied by Kuraray) in 20 parts of n-propanol and 72 parts of deionised water was prepared by heating, with stirring, the mixture to 80° C., until all the polymer had dissolved.

A coating was then prepared by blending 50 parts of (a) with 50 parts of the clay dispersion (b) of Example 1 using a cavitation type mixer. The coating was applied to corona discharge treated Mylar 800 using a No. 1 K-Bar.

The oxygen and carbon dioxide barriers of the coated substrate were then determined and are shown in Table 2. Although the carbon dioxide transmission rate (CDTR) for Example 3 is not significantly different from Example 1, it should be noted that this test was carried out at 0% relative humidity. However, the oxygen transmission rate (OTR), performed at 75% relative humidity indicates that the inclusion of Exceval AQ4104, an EVOH type polymer having less than 20 mol. % ethylene content, in Example 1 provides a superior gas barrier performance at higher levels of relative humidity when compared with Example 3.

Example 4

Into 50 parts of the polymer solution (a) of Example 1 was blended a pre-mixed solution of 15.0 parts of iso-propanol and 33.5 parts of deionised water. 1.5 parts of Cloisite Na+ were then dispersed into this solution under the same conditions as that used to prepare the clay dispersion in Example 1. The coating was applied to corona discharge treated Mylar 800 using a No. 1 K-Bar.

The oxygen barrier and carbon dioxide barriers of the coated substrate were then determined, and are shown in Table 2. The oxygen transmission rate (OTR) and carbon dioxide transmission rate (CDTR) shows that Example 4 has a significantly poorer barrier than Example 1. This result demonstrates the preference for preparing the coating as a 2-component system, where the clay is dispersed separately.

TABLE 2

| Coating | Dry Film Weight (g/m²) | OTR (cm³/m²/day) 75% RH | CDTR (cm³/m²/day) 0% RH |
|---|---|---|---|
| None | — | 103.4 | 639.5 |
| Example 1 | 0.30 | 17.2 | 1.11 |
| Example 2 | 0.30 | 5.0 | 1.60 |
| Example 3 | 0.30 | 27.2 | 0.90 |
| Example 4 | 0.30 | 75.1 | 3.54 |

Example 5

Coating Example 5 included Exceval AQ-4104 at a relative concentration (% of solid content) of 43.75%, Cloisite Na+ at a relative concentration of 44.375 and poly(acrylic acid) at a relative concentration of 11.875. The coating composition was prepared by blending a EVOH solution having 12 weight % solids with a clay dispersion having a solid content of 4.5 weight %, and with an aqueous solution of a polycarboxylic acid polymer. The EVOH solution comprised 12% of Exceval AQ4104 and 30% n-propanol. The coating composition was made at a total solid content of about 7.0 weight %, using deionized water.

The clay dispersion contained 4.5 weight % of Cloisite Na+ and 30% iso-propanol; the remainder being deionized water. The clay was initially formed into a slurry in the alcohol, to which the deionized water was then added; then a Dispermat CV cavitation type high shear blender with a 1 L cylindrical vessel and a 4 cm blade was used at 2500 rpm for 45 minutes to prepare the dispersion. The total mass of dispersion was 500 g.

The coating composition of Example 5 was applied with a No. 2 K-bar (about 12 microns) to a freshly corona discharge treated 12 micron Mylar 800. and was dried in a warm flow of air (lab prints were dried with a hair dryer). The laminate was prepared by applying the coating to the treated side of the polyester film, an adhesive was applied over the top of the dried coating then laminated to the treated side of a 30 μm gauge poly(ethene). The adhesive used was supplied by Morchem, PS220/CA40, and was prepared according to the manufacturer's instructions and applied so as to achieve a final dry film weight of about 2.5 gsm. The laminate was then stored for 10 days at 25° C. to ensure full cure of the isocyanate-based adhesive. The laminate was then tested for bond strength after being stored for 2 days at 75% RH and found to provide a bond strength of 2.0 N/15 mm.

Figure 3:
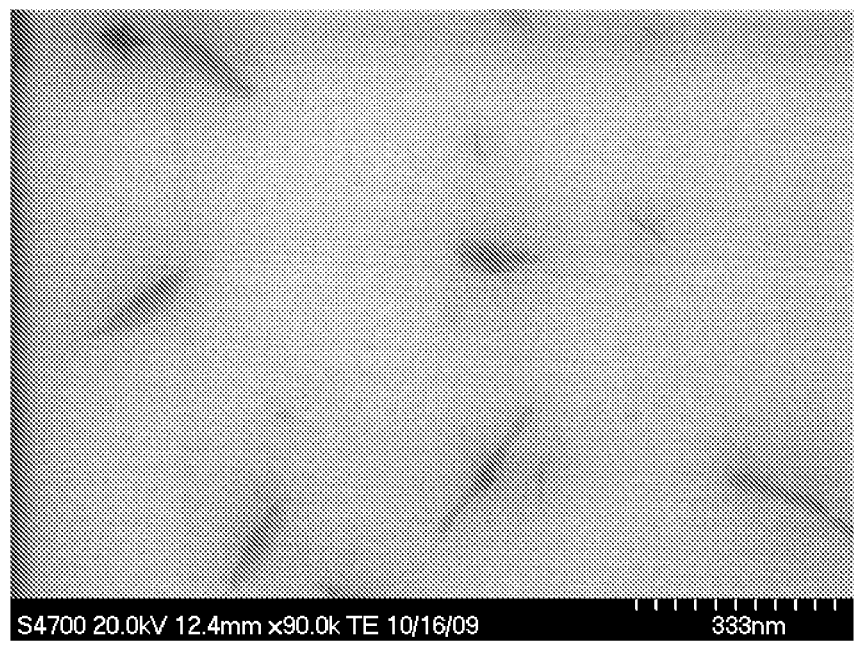
FIG. 3 shows a transmission electron micrograph of a coating composition of the invention.

In order to confirm that the clay has been substantially fully dispersed, a sample of the coating composition of Example 5 was diluted with de-ionised water and then cast onto a copper grid and allowed to dry. The sample was then inspected under a transmission electron microscope to confirm that a substantial portion of the mineral had been fully dispersed. The results are shown in FIG. 3.

Powder X-ray diffraction analysis was also used to confirm that the clay dispersion used in the preparation of Example 5 was fully dispersed. As powder X-ray diffraction analysis is run on a dried and ground coating, it provides indirect information about the extent of dispersion of the wet dispersion. Furthermore, higher concentrations of clay may re-agglomerate during the drying process and as such, information about the level of dispersion of the clay is most reliably obtained when testing coating composition compared using low concentrations of clay.

A coating similar to that of Example 5 but with 10% by weight Cloisite Na+, was analysed. The diffraction peak at 12.1 Angstroms corresponding to the $d_{001}$ (the distance between clay lamellae observed in a sample of undispersed Cloisite Na+) had disappeared indicating that the clay had been exfoliated. As the clay concentration was increased to 25% and the 40-45% concentration of Example 5, a diffraction pattern re-appeared, at 35 and 26 Angstroms respectively. This indicates a re-ordering of the clay in order to provide a diffraction pattern; as the clay concentration increases the distance between lamellae decreases, as would be expected. This data shows that in order to confirm that the dispersion used to prepare Example 5 was fully exfoliated rather than, for example, an intercalated composite, it is necessary to analyse a coating comprising 10 wt % of the clay.

The coating composition of Example 5 was applied at a wet coating thickness of 24 μm, using a No. 3 K-Bar (ex. RK Print) to a freshly corona discharge treated 12 micron Mylar 800 and dried in a warm flow of air. The haze of the coated film was determined using a Byk-Gardner Haze-gard dual apparatus. The haze was found to be 18.5% as a mean average of 8 readings.

This analysis confirmed that the preparation of a clay dispersion using a Dispermat CV cavitation type blender using the techniques described above is sufficient to cause a high level of exfoliation of the clay.

Example 6

Example 6 was a repeat of Example 5 in which the Cloisite Na+ clay was dispersed using a Silverson L4R laboratory vortex-type dispersion apparatus. The Silverson L4R blender was equipped with a 0.5 mm screen, the power setting for the impellor was set at 50% and the clay was dispersed for 45 minutes.

The dispersion of Example 6 was analysed for peak particle size using a CPS DC24000 instrument; disc speed 10000 rpm; cal. Standard diameter 0.377 μm; cal. Standard density 1.385 g/mL; particle size density 2.5 g/mL; particle size absorption 0.01, particle non-spherictity 1.0, fluid density 1.064 g/mL, number of data points 1775; analysis time 5.5 minutes; total weight 44.44 μg; no offset, no noise filtration; peak detection factors: height=0.5, width=10; detected peaks 0.2156 μm. The test indicated a polydisperse sample with a peak maximum equivalent to 216 nm which is what would be expected of a fully exfoliated mineral of this type.

The coating composition of Example 6 was applied at a wet coating thickness of 24 μm, using a No. 3 K-Bar (ex. RK Print) to a freshly corona discharge treated 12 micron Mylar 800 and dried in a warm flow of air. The haze of the coated film was determined using a Byk-Gardner Haze-gard dual apparatus. The haze was found to be 14.2% as a mean average of 8 readings.

Example 7 (Comparative)

Comparative Example 7 is a repeat of Example 5 in which a Dispermat CV cavitation type high shear blender with a 1 L cylindrical vessel and a 4 cm blade was used at 500 rpm for 45 minutes to prepare the clay mixture.

When a Cloisite Na+ dispersion made according to the procedure Comparative Example 1 was analysed using an identical procedure a peak maximum of 252 nm was observed, the significantly higher peak particle size indicates that the clay was not fully exfoliated.

The coating composition of Comparative Example 7 was applied at a wet coating thickness of 24 μm, using a No. 3 K-Bar (ex. RK Print) to a freshly corona discharge treated 12 micron Mylar 800 and dried in a warm flow of air. The haze of the coated film was determined using a Byk-Gardner Haze-gard dual apparatus using the procedure described above for Example 6. The haze was found to be 36.7% as a mean average of 8 readings confirming that the clay had been not been properly dispersed A carbon dioxide barrier material of the invention is shown in FIG. 1. The barrier material (10) includes a barrier coating (1) of the dried coating composition of the invention, for example the composition of any one of Examples 1, 2, 4, 5 or 6 superimposed on a substrate (2).

Figure 2:
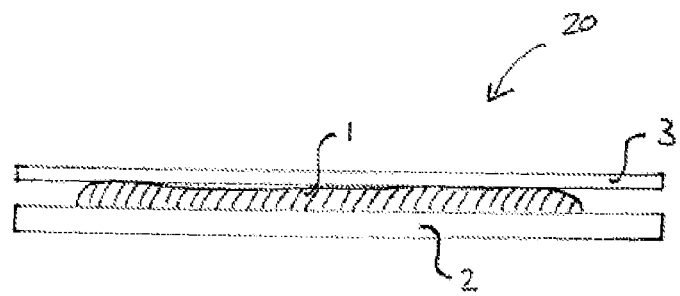
FIG. 2 shows a laminated gas barrier material of the invention.

FIG. 2 shows a laminated gas barrier material (20) in which the barrier coating (1) is sandwiched between a substrate (2) and an overlay (3).

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A method of preparing a carbon dioxide barrier coating composition comprising mixing:
    a) a polymer composition comprising;
        i) a solution or dispersion of EVOH or an EVOH/PVOH mixture; and
        ii) a polycarboxylic acid polymer;
    with
    b) a dispersion of clay;
    wherein the clay is present in an amount of 35 to 50 weight % based on the total solid content of the carbon dioxide barrier coating composition;
    wherein the carbon dioxide transmission rate of a 12 micron PET substrate coated with the carbon dioxide barrier coating composition is less than or equal to 1.3% of the carbon dioxide transmission rate of the uncoated 12 micron PET substrate, when measured at 23° C. and 0% relative humidity.

2. The method according to claim 1, in which the polycarboxylic acid polymer is present in the amount of 5-20 weight % and the EVOH or PVOH/EVOH is present in the amount of 30-60 weight % of the total solid content of the carbon dioxide barrier coating composition.

3. The method of claim 1 wherein the EVOH is a vinyl alcohol-ethylene copolymer having an ethylene content of less than 20 mol. %.

4. The method of claim 1 wherein the clay dispersion is prepared using a high shear dispersion apparatus selected from a vortex, cavitation, or bead mill type dispersion apparatus.

5. A method of preparing a carbon dioxide barrier material, comprising applying the carbon dioxide barrier coating composition prepared according to the method of claim 1 onto a substrate to form the carbon dioxide barrier coating on the substrate and enhance the carbon dioxide barrier properties of the substrate;
    wherein the carbon dioxide transmission rate of a 12 micron PET substrate coated with the carbon dioxide barrier coating composition is less than or equal to 1.3% of the carbon dioxide transmission rate of the uncoated 12 micron PET substrate, when measured at 23° C. and 0% relative humidity.

6. The method of claim 5, wherein the step of applying onto the substrate a coating composition is carried out within 24 hours of completing the mixing of (i) the polymer composition with (ii) the dispersion of a clay.

7. The method of claim 5, wherein the substrate is a flexible polymer film.

8. The method of claim 5, wherein:

$X = A/(B \cdot C) > 100$, in which:

A=Carbon Dioxide Transmission Rate for the substrate at 23° C. and 0% RH without the barrier coating;
B=Carbon Dioxide Transmission Rate for the substrate at 23° C. and 0% RH with the barrier coating; and
C=Coating Weight in g/m$^2$ (dry).

9. The method of claim 5, wherein the carbon dioxide barrier material is a laminate material comprising a first film, which is the substrate, and a second film, wherein the layer of the carbon dioxide barrier coating composition is present between the first film and a second film.

10. The method of claim 9, wherein:

$$X=(A \cdot D)/(B \cdot C)>200,$$

in which:
A=Carbon Dioxide Transmission Rate for the laminate at 23° C. and 50% RH without the barrier coating;
B=Carbon Dioxide Transmission Rate for the laminate at 23° C. and 50% RH with the barrier coating;
C=Coating Weight in $g/m^2$ (dry); and
D=Bond Strength in N/15 mm;
wherein the bond strength D is greater than or equal to 1.0 N/15 mm.

11. A packaged article packaged in a carbon dioxide-rich environment, or a packaged carbonated liquid, wherein the packaging comprises a barrier material prepared according to the method of claim 5.

12. A method of protecting an article from spoilage, prolonging the shelf life of an article and/or delaying deterioration of an article comprising packaging the article in a carbon dioxide-rich environment, in a package that comprises a carbon dioxide barrier material prepared in accordance with the method of claim 5.

* * * * *